(12) United States Patent
Pratt

(10) Patent No.: US 7,733,754 B2
(45) Date of Patent: Jun. 8, 2010

(54) SYSTEM AND METHOD FOR DISC LABELING

(75) Inventor: Thomas L. Pratt, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1322 days.

(21) Appl. No.: 10/935,598

(22) Filed: Sep. 7, 2004

(65) Prior Publication Data

US 2006/0072405 A1    Apr. 6, 2006

(51) Int. Cl.
*G11B 19/00*    (2006.01)
*G11B 5/09*    (2006.01)

(52) U.S. Cl. ............... 369/53.21; 369/53.24; 369/47.5

(58) Field of Classification Search ............ 369/47.12, 369/30.04, 125, 84, 275.1, 275.3, 53.21, 369/53.24; 347/224; 345/629, 636, 676; 715/708, 763
See application file for complete search history.

(56) References Cited

U.S. PATENT DOCUMENTS

| 5,518,325 | A  | * | 5/1996  | Kahle ......................... 369/84 |
| 6,002,657 | A  | * | 12/1999 | Furukawa et al. ........ 369/53.22 |
| 6,226,109 | B1 | * | 5/2001  | Tompkin et al. .......... 369/275.1 |
| 6,714,209 | B2 | * | 3/2004  | Van Valer ................... 345/629 |
| 6,771,297 | B2 | * | 8/2004  | Bronson .................... 347/224 |
| 6,801,487 | B2 | * | 10/2004 | Anderson ................ 369/47.12 |
| 7,095,429 | B2 | * | 8/2006  | Kwasny et al. ........... 369/275.3 |
| 7,269,111 | B2 | * | 9/2007  | Koll et al. ................. 369/53.24 |
| 2003/0108708 | A1 |  | 6/2003 | Anderson et al. .......... 428/64.4 |
| 2003/0194214 | A1 |  | 10/2003 | Anderson et al. ............. 386/95 |

* cited by examiner

*Primary Examiner*—Peter Vincent Agustin
*Assistant Examiner*—Kim-Kwok Chu
(74) *Attorney, Agent, or Firm*—Hamilton & Terrile, LLP; Robert W. Holland

(57) ABSTRACT

An optical disc drive reads identification information from an optical disc inserted in the drive in a label orientation having a label side presented to the optical disc drive laser by reading codes marked at the opposing storage side in a transparent region or marked on the label side oriented to be read from the storage side. The identification information is used to determine the ability and authority of the optical disc to have a label written on the label surface. For instance, label authorization is determined from authorization information embedded on the storage side of the optical disc when the optical disc is in a storage orientation and the label authorization is saved on an associated information handling system with reference to the identification information to allow authorization to be determined when the optical disc is in the label orientation.

9 Claims, 4 Drawing Sheets

SYSTEM AND METHOD FOR DISC LABELING

BACKGROUND OF THE INVENTION

1. Field of the Invention

The present invention relates in general to the field of information handling system media labeling, and more particularly to a system and method for optical disc media labeling based on disc type.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interact through internal or external peripherals to store information on portable media, such as optical discs. Optical disc storage media are available in a variety of types including CD-R, CD-RW, DVD+R, DVD+RW, DVD-R, DVD-RW, and DVD-RAM, with each media having data written by a laser applying a format associated with the media type. Typically, information handling system users will purchase optical media in mass quantities that come on spindles. Although a spindle of optical discs provides a user with a substantial storage capacity, each optical disc on a spindle is generally identical in appearance so that users often have difficulty distinguishing discs from each other after data is stored. A common solution has been to write a label on the disc itself with a non-erasable ink marker. However, recently introduced optical disc labeling methods offer an automated alternative by using the laser to write a label on the non-storage side of a disc. The non-storage side of a disc is treated with a special chemical coating that changes its appearance upon application of a laser to support writing of visually readable labels. Typically, after a user records information on the data storage side of a disc, the user flips the disc over to expose the labeling coating of the non-storage side to the laser and reinserts the disc into the drive for the label to be written with the same drive's optical system.

One difficulty that arises with optical disc labeling is that each laser writes on each disc with a specific set of parameters. Optical disc type identification information embedded on the storage side of each disc is accessed upon initial insertion of a disc so that the optical drive identifies the inserted disc and selects appropriated parameters for writing information. However, once the optical disc is flipped over to write the label on the non-storage side, there is no direct way to read the identification information embedded on the storage side. In some circumstances, disc labeling is undesirable, such as where a disc does not support labeling or a disc is not authorized to use labeling technology. As an example, if a user creates a label for writing on the non-storage side of an optical disc but the drive fails to write the label, the user may believe the drive inoperative, resulting in service calls to the manufacturer of the information handling system. As another example, a user may attempt to create labels before inserting the disc to write data so that the optical drive is unable to determine the type of optical disc involved. Generally, optical drives determine the type of optical disc by reading specific information embedded in the optical disc's data storage side. Often, a bar code circumferentially aligned at the inner diameter of the disc is used to include a unique identifier, such as a serial number, for identifying the disc. The bar code is relatively large in size and ink-written on the transparent outer coating of the optical disc on either the storage side or label side of the disc. The optical drive's pick-up reads the bar code, either directly if on the storage side or through the transparent coating if on the label side, to determine the disc's unique identity and other information such as the type of disc. The optical drive then determines more precise parameters of the disc read from the information embedded in the data storage portion of the optical disc.

SUMMARY OF THE INVENTION

Therefore a need has arisen for a system and method which identifies an optical disc for labeling when the optical disc is inserted with the labeling region exposed to the optical drive's pickup.

In accordance with the present invention, a system and method are provided which substantially reduce the disadvantages and problems associated with previous methods and systems for labeling optical discs. Identification information read from the optical disc in a label orientation confirms that an inserted disc is authorized to have label writing performed with an optical disc drive laser. The identification information is associated with the storage side of the optical disc and read from the label side of the optical disc through a transparent region.

More specifically, a label manager running on an information handling system manages write operations of labels to optical discs. A read label engine of an optical disc drive reads identification information from the storage side of the optical disc while in a label orientation by reading ink markings through a transparent region of the optical disc. The label manager determines optical discs that are allowed and disallowed for accepting labels and stores the status of each determined optical disc in an authorization table on the information handling system. The label manager determines an allowed or disallowed status for each identification information by reading the identification information and authorization information when an optical disc is in a storage orientation. If an optical disc is inserted in a label orientation and has unrecognized identification information, the label manager presents instructions to the information handling system user to reinsert the optical disc in the storage orientation so that the label authorization may be determined for the optical disc from authorization information embedded in the optical disc.

The present invention provides a number of important technical advantages. One example of an important technical advantage is that an optical disc drive's ability and authorization to write a label to an optical disc is confirmed by reading existing identification information of the optical disc. Thus, for instance, an optical disc drive may be authorized to write labels on the labeling surface of a non-storage side of a DVD+R or DVD+RW while prevented from writing labels to DVD-R, DVD-RW and DVD-RAM optical discs. Users are less likely to face confusion about label writes since the optical disc drive is able to determine disc type without flipping between the storage and non-storage sides of the optical disc.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An optical disc drive writes labels to optical disc under management of an information handling system. The optical disc drive reads identification information from the optical disc in a label orientation by reading code on the storage side of the optical disc through a transparent region of the optical disc. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
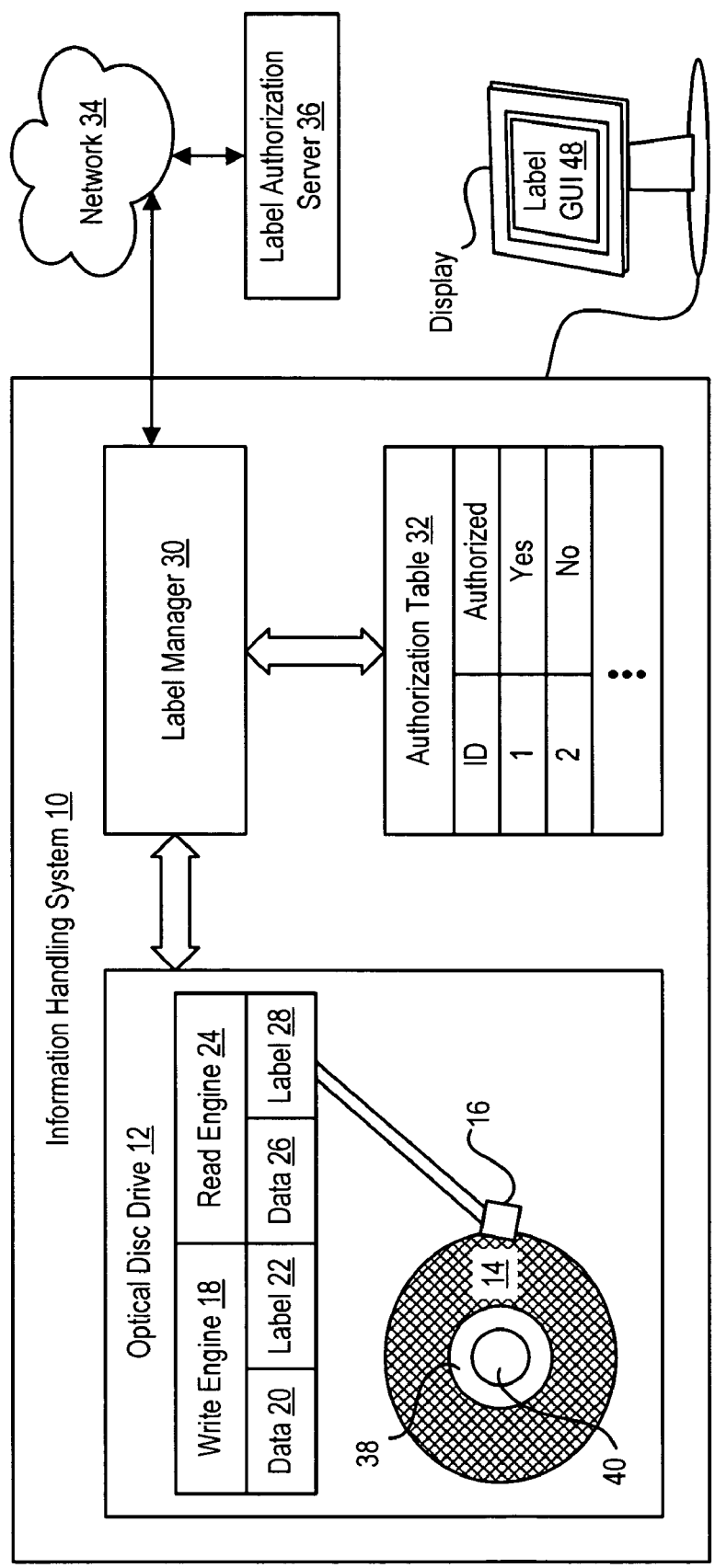
FIG. 1 depicts a functional block diagram of an information handling system having an optical disc label manager.

Referring now to FIG. 1, a functional block diagram depicts an information handling system 10 configured to manage optical disc labeling by an optical disc drive 12. Information handling system 10 includes processing components, such a processor that runs applications, that generate information to write to an optical disc 14. Optical disc drive 12 writes information to and reads information from optical disc 14 with a laser pickup unit 16. Write operations of laser pickup unit 16 are managed with a write engine 18. Write engine 18 includes a data engine 20 that manages data writes to the storage side of optical disc 14 and a label engine that manages label writes to the non-storage or label side of optical disc 14. Data writes occur with optical disc 14 in a storage orientation having the storage surface of the storage side exposed to laser pickup unit 16. Label writes occur with optical disc 14 in a label orientation having the label surface of the label side exposed to laser pickup unit 16. Read operations of laser pickup unit 16 are managed with a read engine 24. Read engine 24 includes a data engine 26 that reads data from the storage surface of the storage side of optical disc 14 when in the storage orientation. Information read by data read engine 26 includes information stored in the storage region of optical disc 14, the embedded information stored in the storage region and bar code identification information inked on the surface of either the storage side or the non-storage side.

In order to manage label writes, read engine 24 includes a label read engine 28 that reads identification information from optical disc 14 in the label orientation. A label manager 30 receives the identification information and looks up the identification information in an authorization table 32. Authorization table 32 is populated with optical disc identification information and a corresponding authorization code indicating whether label writing is allowed or disallowed. Label manager 30 populates authorization table 32 each time an optical disc 14 is inserted in the storage orientation in optical disc drive 12. The identification information is read from the bar code 16 and the label authorization is determined from authorization information embedded in optical disc 14. For instance, if embedded information does not indicate that the inserted optical disc is configured to accept a label, the label authorization is set at no. If embedded information indicates that the inserted disc is configured to accept a label, appropriate write parameters are determined from the embedded information and associated with the identification information in authorization table 32. In some circumstances, an optical disc that is configured to accept a label may not be authorized due to licensing or other constraints. Label manager 30 stores a disallowed authorization for label-ready optical discs that are not authorized, such as due to the optical disc manufacturer identification read from the embedded information or the type of optical disc, like disallowed DVD-R, DVD-RW, and DVD-RAM discs. If label manager 30 detects identification information not found in authorization table 32, a graphical user interface 48 requests the user to re-insert the optical disc to allow an authorization determination to be made. If label manager 30 is unable to determine the authorization of a particular optical disc, access through a network 34 allows confirmation of known authorized optical discs from a label authorization server 36.

Figure 2:
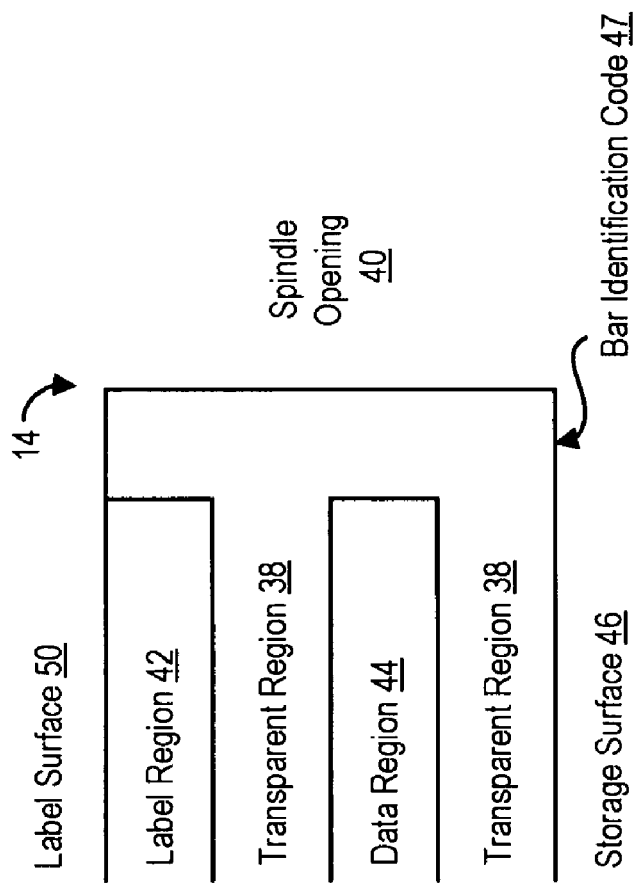
FIG. 2 depicts a side cutaway view of an optical disc having a transparent region.

Although optical disc 14 may include identification information on its label side, this results in additional manufacturing steps and complexity. To simplify the reading of identification information, label read engine 28 reads the bar code information inked onto either the storage or label surface of the optical disc 14 through a transparent region 38 proximate to a spindle opening 40. As depicted by a simplified side cutaway view of a DVD optical disc 14 in FIG. 2, transparent region 38 has an optically clear material that encloses and protects the data region 44. Label region 42 is coated over the transparent region on the non-storage side of the optical disc. The identification information is bar coded on the storage surface 46 but read by laser optical pickup 16 from the label surface 50 through the transparent region 38. Note that the identification information may alternatively be bar coded on the transparent portion of the label surface 50. Since label read engine 28 reads the identification code from the opposing of the intended side, the code is read in reverse and re-ordered for use by label manager 30. The extra thickness of the transparent region 38 due to reading through the entire thickness of the optical disc degrades the capability of optical laser pickup 16, but the bar code features are inked in relatively large markings so that a degraded optical spot is still able to read the identification information. In alternative embodiments, additional label write information may be associated with the bar code information and determined by a read of the bar code in the label orientation. For instance, parameters for writing the label, data or symbols to be included in the label are determined from a read of the bar code in the label orientation. The additional label write information may be included in the bar code information itself or read from embedded information in the storage orientation and stored in the optical drive by association with the bar code information so that the additional label write information is retrieved from the optical drive when the bar code is read in the label orientation.

Figure 3:
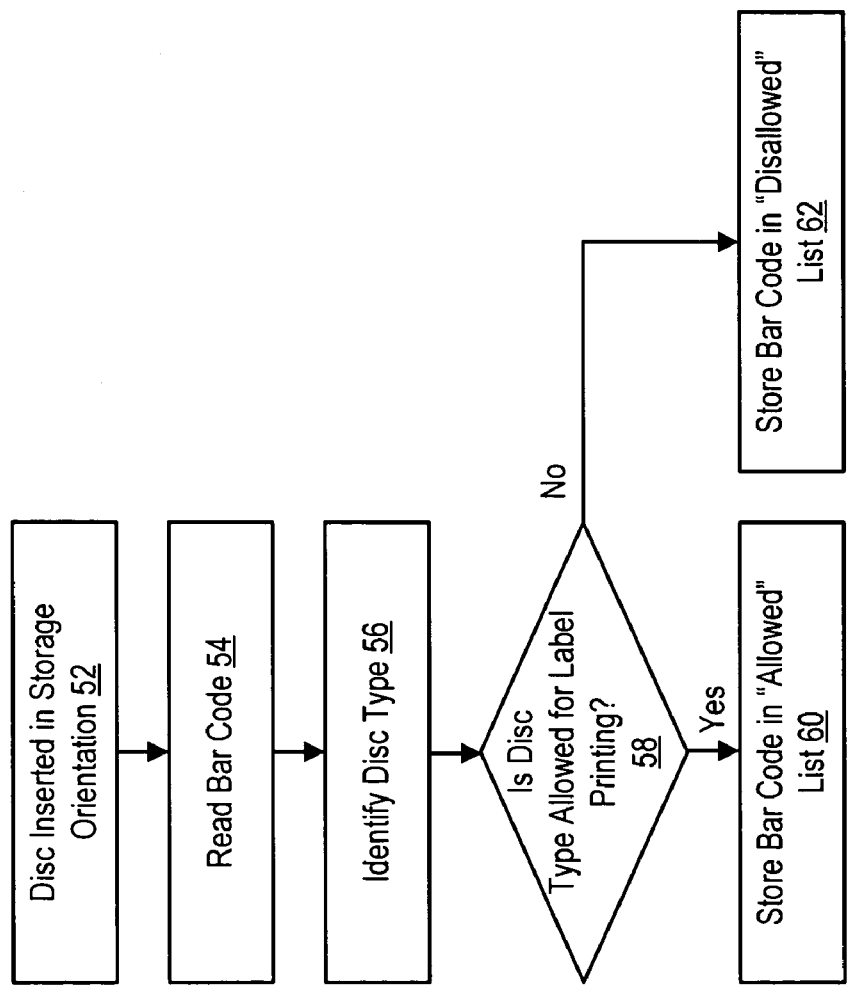
FIG. 3 depicts a process for determining label authorization with the optical disc in a storage orientation.

Referring now to FIG. 3, a flow diagram depicts a process for determining label authorization with the optical disc in a storage orientation. The process begins at step 52 with the optical disc inserted in the storage orientation and continues to step 54 for reading of the bar coded identification information in a conventional manner. At step 56, the optical disc type is identified and, at step 58 a determination is made of whether the identified disc type is authorized for label printing. The determination of the label authorization for the optical disc depends upon the parameters required for authorization and the associated information read from the storage region, such as embedded information associated with the authorization determination. If the optical disc is authorized to accept a label written by the optical drive laser to the label side, then at step 60 the bar coded identification information is stored on the information handling system with an "allowed" status. If the optical disc is not authorized to accept a label written by the optical drive laser to the label side, then at step 60 the bar coded identification information is stored on the information handling system with a "disallowed" status.

Figure 4:
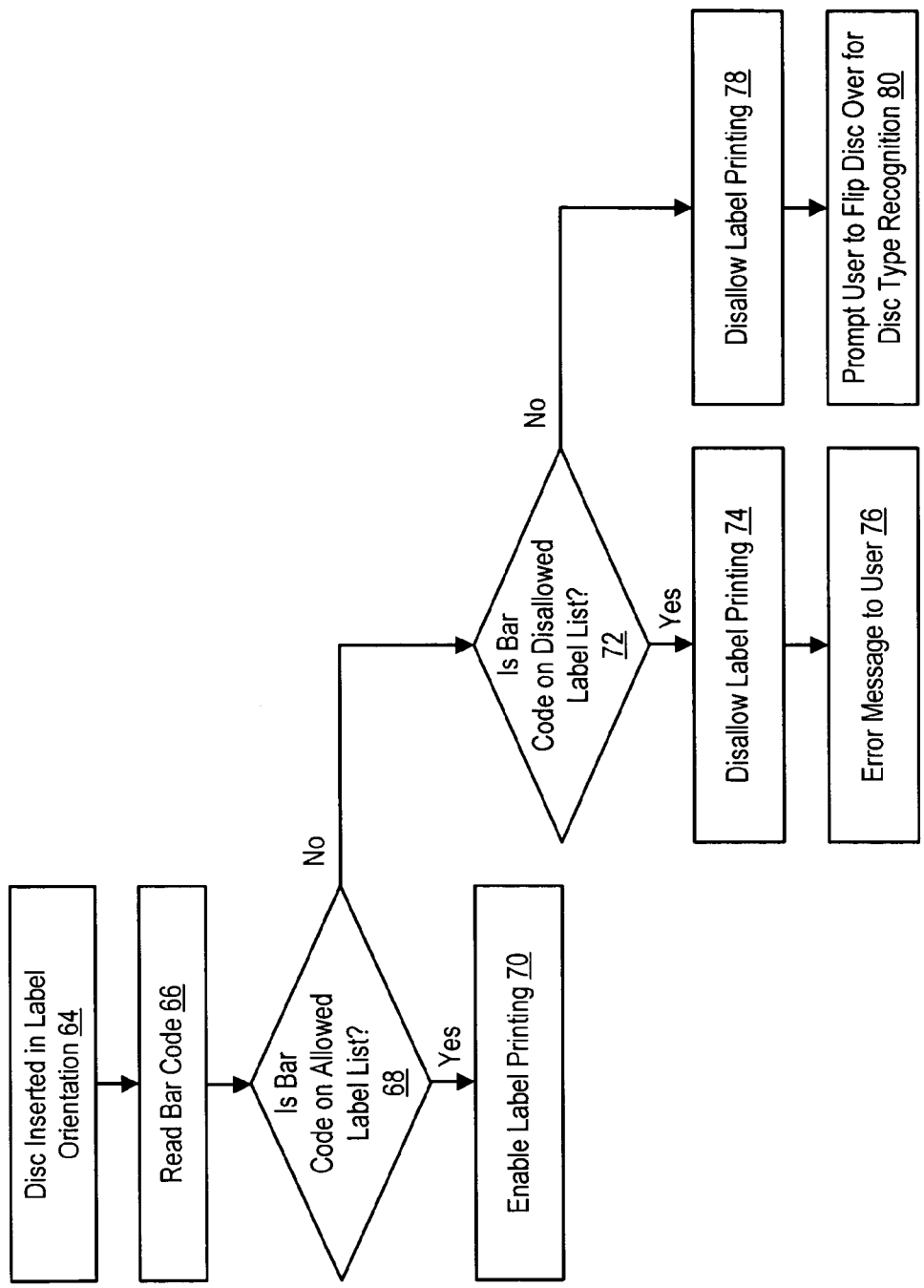
FIG. 4 depicts a process for determining the label authorization with the optical disc in the label orientation.

Referring now to FIG. 4, a flow diagram depicts a process for determining the label authorization with the optical disc in the label orientation. The process begins at step 64 with the optical disc inserted in the label orientation and continues with the reading of the bar code identification information through the transparent region. At step 68 a determination is made of whether the bar code identification information matches allowed identification information stored on the information handling system. If the label authorization is allowed, the process completes at step 70 with printing of the label on the label side of the optical disc. If the bar code identification read from the optical disc is not allowed, the process continues to step 72 to determine if the read identification information is associated with a disallowed status. If the identification information is associated with a disallowed optical disc, the process continues to step 74 at which the label printing is disallowed and completes at step 76 with an error message to the user that label printing is not permitted with the inserted optical disc. If at step 72 the bar code identification information is not disallowed, the process continues to step 78 at which label printing is discontinued and completes at step 80 with a message to the user requesting that the user reinsert the optical disc in the storage orientation to allow an analysis of the embedded information and the adding of the optical disc identification information to the information handling system label manager.

Although the present invention has been described in detail, it should be understood that various changes, substitutions and alterations can be made hereto without departing from the spirit and scope of the invention as defined by the appended claims.

What is claimed is:

1. A method for writing a label to an optical disc, the optical disc having a data surface for storing information and an opposing label surface for accepting a label, the method comprising:
    inserting the optical disc into an optical disc drive in a label orientation having a laser of the optical drive positioned to write to the label surface;
    aligning the laser over a transparent region of the optical disc, the transparent region covering a data surface;
    reading identification information with the laser, the identification information coded on the data surface as a bar code for identifying the type of optical medium and read through the transparent region;
    determining from the identification information that the optical disc drive is authorized to write a label to the label surface with the laser;
    writing the label to the label surface with the laser if authorized;
    determining that the authorization of the identification information is cannot be identified;
    reinserting the optical disc in the optical disc drive in a storage orientation having the laser of the optical drive positioned to read from the data surface;
    reading the identification information and authorization information from the optical disc to determine the label authorization of the optical disc;
    storing an authorization associated with the identification information; and
    reinserting the optical disc in the optical disc drive in the label orientation.

2. The method of claim 1 further comprising:
    determining from the identification information that the optical disc drive is not authorized to write a label to the label surface with the laser; and
    preventing writing of the label to the label surface with the laser if unauthorized.

3. The method of claim 1 further comprising:
    inserting the optical disc in the optical disc drive in a storage orientation having the laser of the optical drive positioned to read from the data surface;
    reading the identification information and authorization information from the optical disc to determine the label authorization of the optical disc; and
    storing on an information handling system associated with the optical disc drive an authorization associated with the identification information.

4. The method of claim 3 wherein the optical disc comprises a DVD and the authorization information comprises authorization for DVDs having DVD+R or DVD+RW formats.

5. The method of claim 1 further comprising:
    interfacing with a network;
    communicating through the network with a label authorization server to determine the label authorization of the optical disc.

6. An optical disc drive comprising:
    a laser operable to write data on a storage side of an optical disc if the optical disc is aligned in a storage orientation and to write labels on a non-storage side of the optical disc if the optical disc is aligned in a label orientation;
    a write engine interfaced with the laser and operable to communicate with an information handling system, the write engine operable to manage data and label writes with the laser;

a read engine interfaced with the laser and operable to communicate with an information handling system, the read engine operable to manage the reading of information by the laser from the storage side of the optical disc aligned in the storage orientation and to manage the reading of identification information by the laser from the non-storage side of the optical disc oriented in the label orientation, the identification information comprising a bar code printed on either the storage or non-storage side of the optical disc in a transparent region, the bar code identifying the type of optical disc, the laser reading the bar code in the label orientation; and a label manager in communication with the write engine and the read engine, the label manager operable to determine from the identification information whether to authorize the write engine to write a label on the optical disc;

wherein the label manager comprises an application running on an information handling system, the label manager operable to determine authorization from authorization information read from the data side of the optical disc and stored on the information handling system in association with the identification information.

7. The optical disc drive of claim 6 wherein the optical disc comprises a DVD, the label manager authorizing label writes to the DVD for identification codes associated with authorization information that the DVD is a DVD+R or DVD+RW discs.

8. The optical disc drive of claim 6 wherein the optical disc comprises a DVD, the label manager disallowing label writes to the DVD for identification codes associated with authorization information that the DVD is a DVD-R, DVD-RW or DVD-RAM discs.

9. The optical disc drive of claim 6 wherein the label manager is further operable to instruct a user to insert the optical disc in a storage orientation if the identification information read in the label orientation is not recognized.

* * * * *